A. H. GOODMAN.
POISON WHEAT DISTRIBUTER.
APPLICATION FILED SEPT. 6, 1917.
1,270,510.
Patented June 25, 1918.
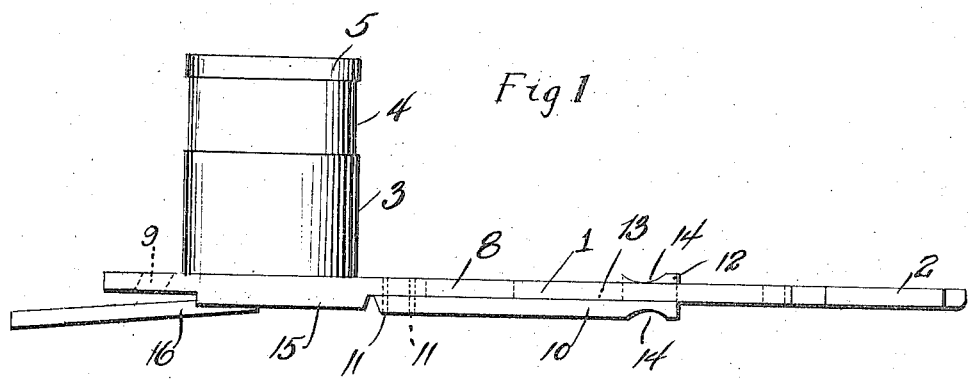
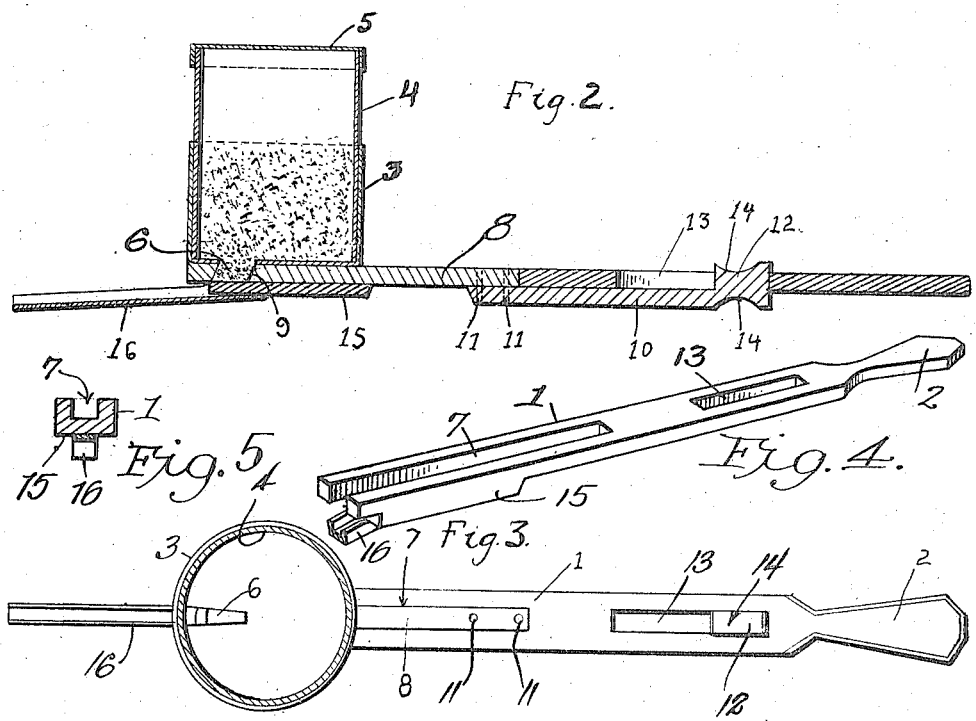
INVENTOR
Albert H. Goodman
WITNESSES
Alfred Hazel.
M. H. Mulligan.
ATTORNEY

UNITED STATES PATENT OFFICE.

ALBERT H. GOODMAN, OF OAKLAND, OREGON.

POISON-WHEAT DISTRIBUTER.

1,270,510.  Specification of Letters Patent.  Patented June 25, 1918.

Application filed September 6, 1917.  Serial No. 190,018.

*To all whom it may concern:*

Be it known that I, ALBERT H. GOODMAN, a citizen of the United States, residing at Oakland, in the county of Douglas and State of Oregon, have invented certain new and useful Improvements in Poison-Wheat Distributers, of which the following is a specifications.

This invention relates to a poison distributer and the primary object of the invention is to provide a device for dispensing poison in the form of dry substances such as poison seed, wheat or other similar material that may be eaten by rodents and other small animals the object being to exterminate them.

One of the principal objects of the invention is to provide a wheat container having a means for projecting predetermined quantities into gopher holes and the holes of other rodents which do damage to growing crops.

Another object of the invention is to provide a device of this character which will project a predetermined quantity of the poisoned material at each reciprocation of the actuating means held in the hand of the user of the device.

The invention also aims to provide a projecting mechanism that will shoot or forcibly eject a quantity of the poisoned material so that it will penetrate the hole of the rodent for permitting it to eat of the poisoned material without coming to the surface; the idea being to reach the nest of the animal.

Referring to the drawing wherein is illustrated the preferred form of my invention in which like numerals of reference indicate corresponding parts throughout the several views and the shank 1 is in the form of an elongated arm or bar having a handle 2 provided at one end and a hopper 3 mounted at its opposite end. The hopper is preferably of cylindrical formation and is fastened to the end of the arm 1 in any preferred manner. This hopper receives a container 4 which fits properly within the hopper and contains a quantity of poison such as wheat mixed with Paris green or the like—it having been found that this material is most suitable for rodents of this character.

The receptacle 4 is provided at one end with a cover 5 and since the opposite end of the receptacle is open and of the same size it will be noted that the said end may also be provided with a similar cover when the receptacle is not in use and when it is detached from the hopper 3. In this manner the poisoned material may be kept in a safe place remote from the device so that persons unfamiliar with the use of the material will not be poisoned thereby.

In the bottom of the hopper 3 I have provided an opening 6 and in the arm or shank 1 is an elongated slot 7. A plunger 8 is mounted in the slot 7 and extends forwardly beneath the hopper and near one end the plunger is provided with an opening 9 the end walls of which are cut at an angle as clearly indicated in Fig. 2 of the drawings. This opening 9 is the same size as the opening 6 in the bottom of the hopper and when the two openings 6 and 9 are alined with each other it will be obvious that the poisoned wheat in the hopper or receptacle will pass into the opening 9 in the plunger. The plunger 8 is actuated by a connecting arm 10 disposed beneath the bar 1 and connected to the plunger by rivets or other fastening elements 11.

A further object of this invention is the provision of a poison distributer which consists of a comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which:—

Figure 1 is a side elevation.
Fig. 2 is a longitudinal section.
Fig. 3 is a top plan.
Fig. 4 is a perspective view of a portion of the invention.
Fig. 5 is a detail cross section taken through one end of the member shown in Fig. 4.

The head 12 is fastened to one end of this connecting rod 10 and the adjacent end of the bar 1 has an elongated slot 13 through which the head 12 projects. The upper and lower edges of the head 12 have finger holds to facilitate gripping the head to actuate the connecting rod 10 by reciprocating the head through the slot 13.

At its forward end the bar 1 is thickened as indicated at 15 thus providing a support for the forward end of the plunger 8 and through which the slot 7 extends. The forward end of this enlarged portion forms a closure for the opening 9 when the plunger is in retracted position thus preventing the poisoned wheat from dropping through the opening. A spout 16 is fastened to this enlarged end 15 of the bar 1 and the spout may be of any desired length and is disposed at an angle as indicated at Figs. 1 and 2. The spout is in the form of a handle and is longitudinally alined with the opening 9 so that when the plunger is thrust forwardly the seed or poisoned wheat from the opening 9 may be ejected into the spout and will travel therethrough and be projected from the end of the spout. The free end of the spout will, of course, be extended into a hole of the animal desired to be exterminated and when the plunger is reciprocated the desired quantity of the poisoned material may be ejected into the spout and into the animal's nest. By virtue of the angularly disposed ends of the opening 9 the poisoned wheat will be forcibly ejected forwardly when the plunger is forcibly reciprocated and as the plunger moves forwardly the material in the opening 9 will be ejected and the opening in the bottom of the hopper 3 will be closed to prevent any additional material dropping from the hopper until the plunger has been retracted.

It will be understood that any suitable poison in the form of dry material may be used in the device and the spout may be of any desired length so that it may penetrate deeply into the hole formed by the rodent.

The usual method of sprinkling the poisoned material in and around the hole is thus greatly improved as the material is forcibly ejected so that it will penetrate deeply and reach the nest of the animal and thus be more likely to be eaten by the young rodents; the extermination of the rodents being thereby facilitated.

From the foregoing it will be observed that a very simple and durable poison distributer has been provided, and the details of which embody the preferred form. I desire it to be understood, however, that slight changes in the minor details of construction may be made without departing from the spirit of the invention or the scope of the claims hereunto appended.

I claim—

1. A dispensing device comprising a hopper a shank having the hopper mounted thereon, a spout projecting forwardly from the end of the shank beneath the hopper, and means arranged for reciprocatory movement in the said shank and beneath the said hopper to eject a predetermined quantity of the material in the hopper through the said spout.

2. A dispensing device comprising a hopper containing a quantity of material to be dispensed, a shank having a hopper mounted thereon, the said hopper at the bottom thereof being provided with an opening, a spout fastened beneath the hopper and projecting forwardly therefrom at an angle, and means adapted to intermittently aline with the said opening in the hopper to eject a predetermined quantity of material in the hopper into the said spout upon the reciprocation of the said means.

3. A dispensing device comprising a shank having an elongated slot at one end, a plunger arranged in the slot and provided with an opening, one end of the said shank being thickened to provide a closure for the opening when the plunger is in retracted position, means for holding a quantity of the material to be dispensed above the plunger, and a spout fastened beneath the end of the said shank and having open communication with the opening in the said plunger when the latter is projected forwardly.

In testimony whereof I affix my signature in presence of two witnesses.

ALBERT H. GOODMAN.

Witnesses:
 Roy Stearns,
 E. G. Young, Jr.